Sept. 26, 1933.         H. A. DOUGLAS         1,928,414
CIRCUIT CONTINUING DEVICE
Filed Jan. 13, 1932         2 Sheets-Sheet 1
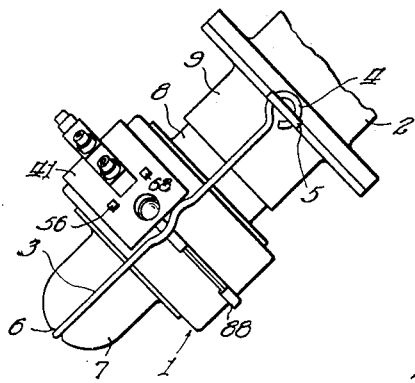
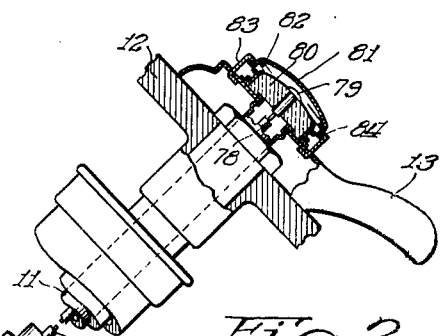
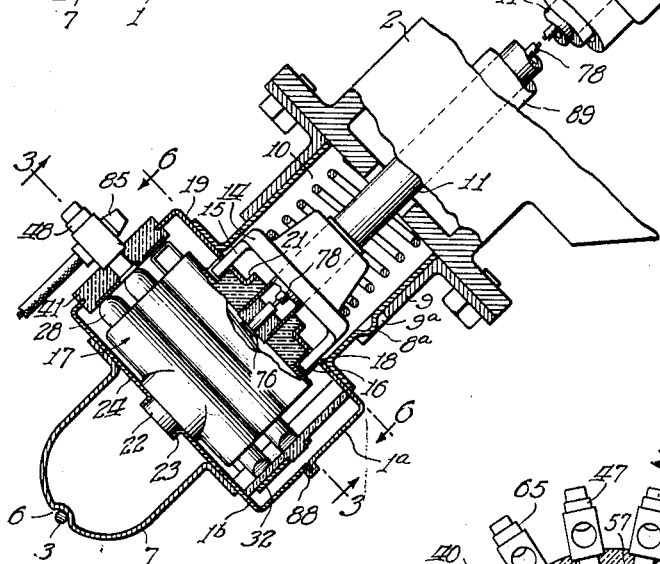
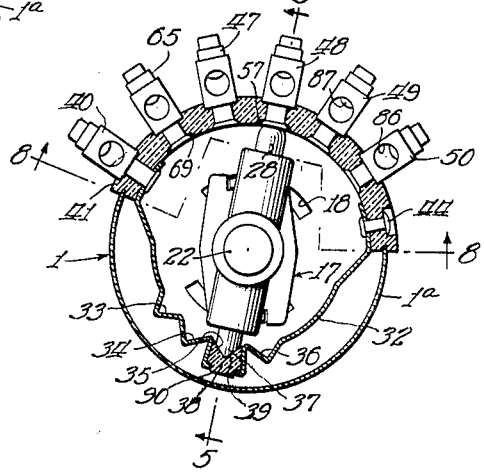
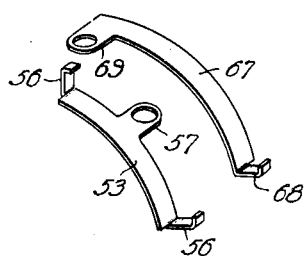
Inventor
Harry A. Douglas
By Langdon Moore
Atty.

Sept. 26, 1933.    H. A. DOUGLAS    1,928,414
CIRCUIT CONTINUING DEVICE
Filed Jan. 13, 1932    2 Sheets-Sheet 2
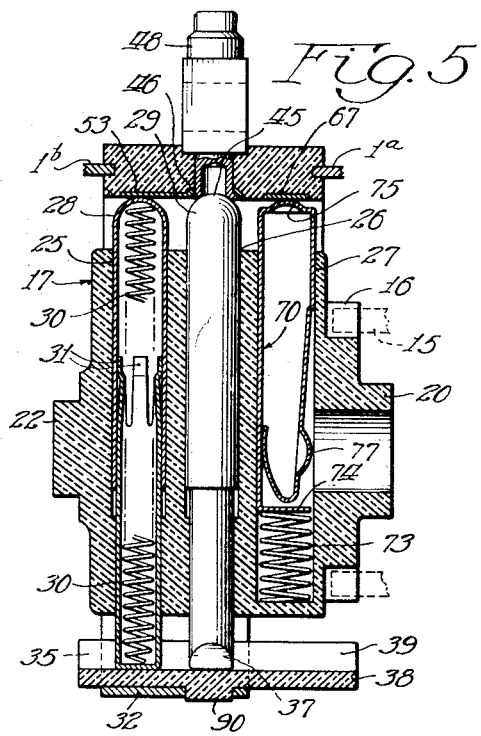
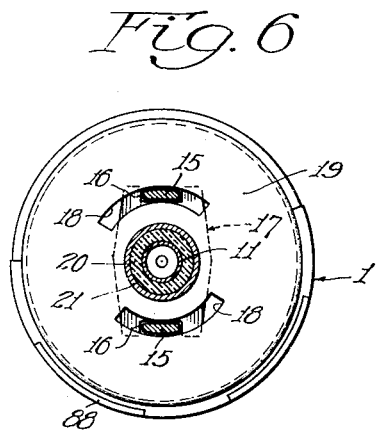
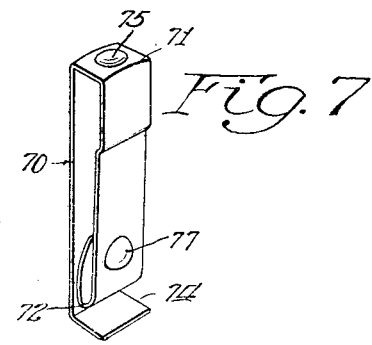
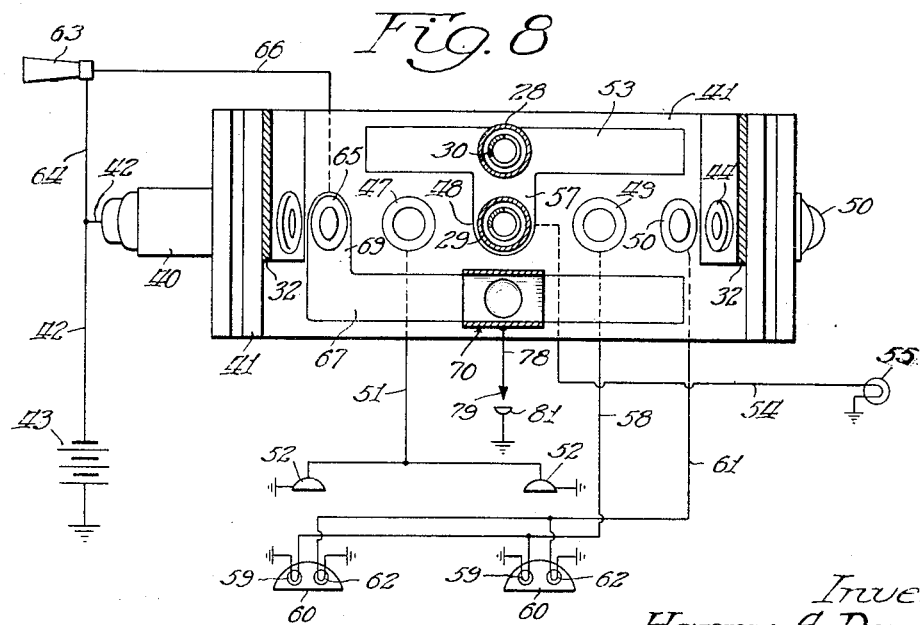
Inventor
Harry A. Douglas Patented Sept. 26, 1933

1,928,414

UNITED STATES PATENT OFFICE 1,928,414

CIRCUIT CONTINUING DEVICE

Harry A. Douglas, Bronson, Mich.

Application January 13, 1932. Serial No. 586,366

7 Claims. (Cl. 200—8)

This invention relates to circuit continuing devices more particularly for automotive vehicles and electrical circuits associated therewith.

Among other objects, the invention aims to provide an improved casing which is assembled with the lower end of the steering column of an automotive vehicle, and circuit continuing devices enclosed in the casing, the circuit continuing devices being actuated by means located adjacent the upper end of the steering column.

Subject matter disclosed and not claimed in this application is clamed in my copending application Serial No. 584,444 filed January 2, 1932.

This invention will be more fully explained by reference to the illustrative construction shown in the accompanying drawings, in which—

Figure 1 is a general view of my improved casing as it is preferably assembled with the steering column;

Figure 2 is an enlarged longitudinal view partially in section of the structure of Figure 1;

Figure 3 is a cross section taken on the line 3—3 of Figure 2, parts being shown in elevation;

Figure 4 is a perspective view of separated parts of the mechanism;

Figure 5 is a partial section taken on the line 5—5 of Figure 3 and somewhat enlarged;

Figure 6 is a section taken on the line 6—6 of Figure 2;

Figure 7 is a perspective view of one of the parts of the mechanism; and

Figure 8 is a section taken on the line 8—8 of Figure 3 and showing diagrammatically a number of illustrative circuits.

Referring to the figures of the drawings, I have shown in general a switch casing 1 assembled with the lower end of the inclined steering column 2 as by means of a flexible member such as the wire strap 3, which is secured at each end to the steering column as by means of a loop 4 of the strap, which encircles a lug 5 on the steering column. The strap 3 is in retaining engagement with the switch casing 1 by reason of its passing around the casing and having its mid-portion located in a groove 6 in the outer end of a domelike portion 7 in which the casing 1 terminates. To further insure assembly of the casing and the steering column these parts may have a telescopic relationship, a cylindrical portion 8 of the casing being received in a cylindrical socket 9 fixed to the lower end of the steering column 2. To prevent relative rotation of the casing and the steering column, the casing may be provided with a lug 8a struck out from the cylindrical portion 8 and which fits into an open ended slot 9a in the socket 9. A coil spring 10 is desirably enclosed in the cylindrical portion 8 and between the casing and the steering column to press the casing against the strap 3 and thus effect a tight and secure engagement of the parts.

In the illustrative construction the spring 10 surrounds a shaft 11 which extends from the casing through the inclined steering column 2 to the steering wheel 12 where the shaft is suitably connected with a hand lever 13 by which the shaft 11 may be rotated. At its lower end the shaft 11 has suitably fixed thereon a yoke 14 having diametrically disposed fingers 15 which are snugly received in slots 16 in the contact carrier 17 which may thus be turned by rotation of the shaft 11. I have shown the carrier 17 formed entirely of insulating material, such as hard rubber. The carrier 17 is disposed in a plane extending along the axis of the shaft 11 and passing through said axis. Rotation of the carrier 17 is here shown limited by arcuate slots 18 in the end wall 19 of the casing 1 through which the fingers 15 pass. As here shown, the carrier 17 has a hollow hub portion 20 which is journaled in a centrally disposed opening in the wall 19, the opening being preferably flanged as at 21 to provide a bearing for the hub 20. At its opposite or lower end the carrier 17 has another hub portion 22 which is journaled in a similar bearing 23 in the inner wall 24 of the casing 1. Thus the insulating contact carrier 17 is arranged to rotate on an axis coincident with the axis of the shaft 11 and upon rotation of said shaft.

In accordance with my invention the insulating contact carrier 17 is bored in the direction of the greatest width of the carrier, the bore being adapted to receive a metallic contact member to be spring pressed radially of the axis of rotation of the carrier and the shaft 11. In the illustrative construction the carrier 17 is provided with three bores 25, 26 and 27 (Figure 5) arranged parallel in a plane extending along the axis of the shaft 11 and passing through this axis, the bores extending in a direction which is perpendicular to the axis. The bores 25 and 26 are shown cylindrical and extend through the carrier 17 so that the metallic contacts 28 and 29 disposed therein each extend diametrically on both sides of the axis of the shaft 11. As here shown each of the contacts 28 and 29 comprises two telescoping metallic tubes closed at their outer ends and together enclosing a coil spring 30 which presses the tube sections apart. One of these tube sections which is received by the other section is desirably provided at its inner end with spring fingers 31 which may be sprung outwardly slightly to be compressed by the other tube section and thus by friction to maintain the tube sections in assembly. Under the action of the spring 30, the tube sections of the contacts 28 and 29 are pressed at each end into engagement with circumferentially disposed complemental contacts carried by the casing 1. One of these complementary contacts is desirably produced in a relatively thin metallic plate 32 which is bent to form a plurality of parallel grooves 33, 34, 35 and 36 disposed longitudinally of the axis shaft 11. These grooves are desirably V-shape and receive with a snap action the V-shape terminations 37 of one end of the contacts 28 and 29. One of these grooves such as the groove 35 need not itself be V-shape but, for a purpose presently pointed out, is advantageously filled with a block of insulation 38 in which the V-shape groove 39 is formed corresponding to the grooves 33, 34 and 36.

The plate 32 is mechanically and electrically connected at one end to a metallic terminal post 40 which is carried by a semi-cylindrical insulating wall member 41 fixed securely to and forming a part of the casing 1, as by being suitably clamped between the cup-shaped sections 1a and 1b of the casing. An insulated conductor 42 (Figure 8) electrically connects the terminal 40 and consequently the plate 32 with one side of the grounded battery or other source of current 43. The plate 32 is insulated from the casing 1 as by being spaced from the metallic wall thereof and anchored at its end opposite the terminal 40 in the insulating wall member 41, as by the rivet 44. Thus the contacts 28 and 29 are confined between the plate 32 and the wall member 41 and are spring pressed into engagement with these parts.

The contacts 28 and 29 provide electrical bridging members between the plate 32 and other complementary contacts also circumferentially disposed within the casing 1 on the insulating wall member 41 and upon the side of the casing diametrically opposite and coaxial with the grooves 33, 34, 35 and 36 and also coaxial with the shaft 11. The rounded end 45 of the contact 29 seats in cup shaped contact portions 46 of metallic terminal members 47, 48, 49 and 50. The portions 46 of each of these terminal members are clinched upon the inner face of the insulating wall 41 to maintain the parts in assembly. The complementary contacts thus formed are arranged in a common plane which is transverse to the axis of the shaft 11 and which passes through the contact 29. The contact 29 thus forms an electrical bridge between the contact 32 and the contacts 47, 49 and 50. The contact 28 forms a bridge between the contact 32 and a complementary contact later described.

When the carrier 17 is in the position shown in Figure 3, the terminations 37 of the contacts 28 and 29 are in the groove 39 in the insulating block 38, consequently the circuit through the battery 43 is discontinued, since in this position the contacts 28 and 29 are insulated from the contact 32 which is connected with the battery. When, however, the shaft 11 and consequently the carrier 17 are rotated to cause the contacts 28 and 29 to have their terminations 37 located in the groove 36, for example, a circuit is established through the battery 43, conductor 42, plate 32, contact 29, terminal 47 and an insulated conductor 51 through the grounded filaments of the parking lights 52. At the same time another circuit is established through the battery 43, conductor 42, plate 32, contact 28, contact plate 53 terminal 48 and insulated conductor 54 through the grounded filament of the rear or tail light 55. The plate 53 is arcuately disposed in the inner surface of the insulating wall 41 as by the fingers 56 which pass through the wall 41 and are clinched on the outer surface thereof. The plate 53 extends abreast of the terminals 47, 48, 49 and 50 and has a lateral extension 57 by which the plate 53 is electrically connected with the terminal 48 and thus with the rear light 55.

When the carrier 17 is rotated to cause the contacts 28 and 29 to have their terminals 37 located in the groove 34 a circuit is established through the battery 43, conductor 42, plate 32, contact 29, terminal 49, conductor 58 and through the grounded filaments 59 of the head lamps 60. The filaments 59 may be the intermediate driving lights of the vehicle, for example, as by being located above the focus of the lamps 60. At the same time when the carrier 17 is in this position another circuit is established through the contact 28, plate 53 and through the rear light 55.

When, again, the contact carrier is further rotated to cause the contacts 28 and 29 to have their terminals 37 located in the groove 33 a circuit is established through the battery 43, conductor 42, plate 32, contact 29, terminal 50 and conductor 61 through the grounded filaments 62 of the head lamps 60. The filament 62 may be the normal driving lights of the vehicle as by being located in the focus of the lamps 60. At the same time when the contact carrier is in this position a circuit is established also through the contact 28 and plate 53 through the rear light 55 as is now understood.

Thus in any position of the contact carrier except the "off" position (at which latter time the contacts 28 and 29 have their terminations 37 located in the groove 39 of the insulating block 38), the rear light 55 is energized as well as one of the pairs of parking, intermediate driving lights, or normal driving lights.

An electro-magnetic horn 63 is desirably connected with the battery 43 by the conductor 64 and with the terminal 65 by the conductor 66. The terminal 65 is similar in construction to the terminals 47, 48, 49 and 50, but is outside the arc of rotation of the carrier 17, so that the contact 29 does not engage the terminal 65. An arcuate plate 67 is disposed on the inner surface of the insulating wall member 41 similarly to the plate 53. The plate 67 has a finger 68 similar to the fingers 56 which passes through the member 41 and is clinched on the outer surface thereof and a lateral extension 69 which connects the plate 67 mechanically and electrically with the terminal 65. The plate 67 also extends abreast of the terminals 47, 48, 49 and 50, but upon the opposite side thereof from the plate 53. When the contact carrier 17 is in any position within its arc of rotation between the contacts 47 and 50, the plate 67 is engaged by a contact 70 carried by the carrier 17 and radially pressed similarly to the contacts 28 and 29. The contact 70 is desirably formed of an oblong strip of metal which is folded upon itself at 71 and again at 72 (Fig. 7) to provide an elliptic spring effect. The contact 70 does not pass from side to side of the carrier as do the contacts 28 and 29, but is received in the bore 27 which is open at one end only and which is similar in cross section to the cross section of the contact 70. The bore 27 thus provides a spring barrel for the coil spring 73 which abuts a transversely disposed end portion 74 of the contact 70 and presses the contact outwardly into engagement with the plate 67. The bent portion 71 of the contact 70 is desirably of sufficient area and slightly arcuate in the plane of rotation of the parts to make a smooth sliding engagement with the plate 67. The bent portion 71 may carry a slight boss 75 further enhancing the smoothness of engagement with the plate 67. The bore 27 intersects the hollow hub 20 of the carrier 17, so that the inner end of the contact 70 may engage an insulated contact 76 carried axially by the shaft 11, the shaft 11 passing through the hollow hub 20. The contact 70 may have a boss 77 with which the contact 76 engages. Since as so constructed and arranged the contact 70 is resilient transversely of itself, this boss 77 is pressed into engagement with the contact 76. An insulated wire 78 connected with the contact 76 passes through the shaft 11, which is hollow for this purpose, and terminates in a contact button 79 centrally carried by the insulating disc 80 supported upon the hub of the lever 13 at the upper end of the shaft 11. To energize the horn 63, a metallic cap 81 which is superposed upon the disc 80 but is normally spaced from the contact button 79 by the action of the spring 82 is depressible against the action of the spring and axially of the metallic housing 83. The cap 81 and housing 83 have overlapping flanges as at 84 which limit the movement of the cap away from the disc 80. When the cap 81 is depressed, the button 79 (and consequently the horn 63) is grounded through the spring 82 or the housing 83, lever 13, shaft 11, through the metal frame of the car, thus completing the circuit back to the other side of the battery.

The conductors 42, 51, 54, 58, 61 and 66 may be connected with their respective terminals as by being provided with metallic terminal plugs 85 (Figure 2) of conventional bulbous formation which are received in cylindrical openings 86 in the terminals and are yieldingly retained therein by the action of coil springs (not shown) which press upon detents 87 which snap over the bulbous plugs 85.

The casing 1 is conveniently of generally cylindrical formation and the two sections of the casing between which the insulating wall member 41 is clamped may themselves be clamped together by segmental ears 88 formed on one of the sections and clinched over the other section. Constructed as herein described the casing 1 is substantially imperforate so that not only is the entry of dirt into the casing prevented, but grease or oil injected into the casing for purposes of lubrication will not run out therefrom.

The steering column 2 is illustrated as enclosing also a steering shaft 89 which does not enter into the present invention and which therefore need not be further described.

The block of insulation 38 desirably extends from front to rear of the casing 1 and is keyed to the plate 32 by an integral dowel 90 thus preventing the plate 32 from being displaced so as to contact with the metallic wall of the casing.

Obviously, the invention is not limited to the specific details of construction herein described for purposes of exemplification. Furthermore, it is not indispensable that all features of the invention be used conjointly as various combinations and sub-combinations may be advantageously employed.

Having described an embodiment of my invention, I claim:

1. In a switching mechanism, the combination with a metallic casing; of a rotatable shaft entering said casing; an insulating contact carrier journaled in the casing and keyed to rotate with the shaft, said contact carrier having a hollow hub receiving said shaft and having a transverse bore intersecting said hollow hub; a metallic contact received in said bore; an insulated contact carried by said shaft and engaging the contact in the bore of the carrier; and resilient means for determining respective rotative positions of the carrier.

2. The structure of claim 1 in which the contact received in the bore is spring pressed radially of the shaft axis by a coil spring inserted between the contact and the bottom of the bore.

3. The structure of claim 1 in which the contact received in the bore is in the form of an oblong piece of metal bent upon itself to be transversely resilient.

4. The structure of claim 1 in which the contact received in the bore is in the form of an oblong piece of metal bent upon itself to be transversely resilient and wherein it is bent transversely to form an abutment for said coil spring.

5. In a switching mechanism, the combination with a metallic casing; of a contact carrier embodying a block of insulation rotatable in said casing on a fixed axis and having parallel bores therein transverse to said axis; spring pressed contacts in said bores; and integral hubs on said block, one of said hubs being hollow and communicating with the exterior of said casing and with one of said transverse bores.

6. In a switching mechanism, the combination with a metallic casing; of an insulating contact carrier journaled in said casing, said contact carrier having a hollow hub communicating with the exterior of the casing and having a bore intersecting said hollow hub transversely to the axis of the carrier; a resilient metallic contact received in said bore; a rotatable shaft received in said hub and keyed to rotate the carrier on said axis, said shaft carrying an insulated contact engageable with the resilient contact; a spring carried in the bore and urging the resilient contact transversely; an arcuate insulated contact carried by a wall of the casing concentric with said axis and engageable with the resilient contact in all rotative positions of the carrier; and resilient means for determining respective rotative positions of the carrier.

7. In a switching mechanism, the combination with a metallic casing; of an insulating contact carrier journaled in said casing, said contact carrier having a hollow hub communicating with the exterior of the casing and having a bore intersecting said hub transversely to the axis of the carrier; a metallic contact received in said bore; a rotatable shaft received in said hub and carrying an insulated contact engageable with the said first contact; a spring carried by the carrier and urging said first contact transversely of the said axis; an arcuate insulated complementary contact carried by the wall of the casing concentric with said axis and engageable with the first contact in all rotative positions of the carrier; arcuate slots in the casing concentric with said axis; slots in the carrier registering with said slots in the casing; and fingers fixed on the shaft and passing freely through the slots in the casing to be received snugly in the slots in the carrier, said slots in the casing limiting rotation of the carrier.

HARRY A. DOUGLAS.